US005202265A

United States Patent [19]

LaMora

[11] Patent Number: 5,202,265

[45] Date of Patent: Apr. 13, 1993

[54] TONER TAGGANT PROCESSES

[75] Inventor: Karen L. LaMora, Marion, N.Y.

[73] Assignee: Xerox Corporation, Stamford, Conn.

[21] Appl. No.: 782,171

[22] Filed: Oct. 24, 1991

[51] Int. Cl.[5] .................... C01N 21/75; C01N 31/22; C01N 33/26

[52] U.S. Cl. .................................. 436/56; 436/164; 430/31; 430/106; 430/109; 430/114

[58] Field of Search .................. 430/31, 32, 106, 109, 430/114; 436/56, 164

[56] References Cited

U.S. PATENT DOCUMENTS 4,308,327 12/1981 Bird et al. .......................... 430/15
4,543,308 9/1985 Schumann et al. .................. 430/21
4,728,984 3/1988 Daniele .............................. 355/6
4,777,510 10/1988 Russel ............................... 355/7

OTHER PUBLICATIONS

Xerox Disclosure Journal, vol. 13, No. 4, Jul./Aug. 1988, "Copy Sheet and Weight Sensing", N. D. Robinson, Jr.

*Primary Examiner*—James C. Housel
*Assistant Examiner*—David Redding
*Attorney, Agent, or Firm*—E. O. Palazzo

[57] ABSTRACT

A process for the verification of toner compositions which comprises adding to the toner an alkali metal bicarbonate, and thereafter adding thereto an acid thereby causing the formation of effervescence.

24 Claims, No Drawings

TONER TAGGANT PROCESSES

BACKGROUND OF THE INVENTION

The present invention is directed to processes, and more specifically to processes for determining the identification of toner compositions. In one embodiment, the process of the present invention comprises forming a toner, or adding to a toner, a taggant, such as alkali metal bicarbonate like sodium bicarbonate, thereafter adding an acid to the toner like acetic acid, whereby there is formed visible effervescence. Thus, there can be added to toners with the bicarbonate an acid, and if effervescence occurs the toner is identified. When effervescence fails by the addition of the acid, the toner can be considered a different toner, for example a toner not supplied by Xerox Corporation. Accordingly, with the processes of the present invention toner compositions can be quickly and economically verified without further analysis thereof. The processes of the present invention are particularly useful to electrophotographic, especially xerographic, machine maintenance representatives since they can easily determine the manufacturer of the toner.

Illustrated in copending patent application U.S. Ser. No. 636,264, the disclosure of which is totally incorporated herein by reference, is a process for controlling a reproduction system comprising the steps of scanning an image to detect at least one taggant in at least one marking material forming said image; and issuing instructions to said reproduction system, wherein said instructions cause said reproduction system to take an action selected from the group consisting of (a) prohibiting reproduction of those portions of said image formed by a said marking material containing at least one predetermined detected taggant, and reproducing of all other portions of said image; (b) prohibiting reproduction of any part of said image upon detecting of at least one predetermined taggant; (c) reproducing only those portions of said image formed by a said marking material containing at least one predetermined taggant; (d) reproducing portions of said image formed by a said marking material containing at least one predetermined taggant in a different manner from that in which said system reproduces portions of said image formed by a said marking material not containing said at least one predetermined taggant; and (e) identifying a source of said image on the basis of detection of at least one predetermined taggant. It is indicated in this patent application that taggants may also provide security for important documents. The system of the copending application is capable of identifying documents (as well as marking materials) containing taggants which may be present in the toner or ink used to create an image on the document. Thus, copies made using such toner or ink doped with taggant can be readily identified. This can permit subsequent identification of the source of an image, generally by type of machine (for example for statistical data gathering) or more specifically by facility where a copy was made or even by the specific machine unit in which a copy was made (like for document tracking). Further, according to the copending application, documents or portions thereof may also be made incapable of being copied by using tagged marking materials for at least the portion of the document for which protection is desired. The identification of a predetermined taggant may signal the system to prevent scanning, storing or developing operations of the whole document or areas where the particular taggant is present.

SUMMARY OF THE INVENTION

It is an object of the present invention to provide processes for the identification of toner compositions.

It is another object of the present invention to provide processes for the economical verification of toners by utilizing taggants.

It is yet another object of the present invention to provide processes wherein a manufacturer of the toner contained in an imaging apparatus can be identified.

It is still another object of the present invention to provide processes wherein certain toners, such as toners manufactured and sold by Xerox Corporation can be quickly identified by maintenance representatives for warranty purposes without analysis thereof.

Another object of the present invention is to provide processes for determining the authenticity of Xerox Corporation toners.

These and other objects of the present invention can be achieved by providing processes for the identification of toner compositions. More specifically, the present invention is directed to processes for the verification of toners, especially Xerox Corporation toner compositions, which comprises initially adding to the toner prior to its sale an alkali metal bicarbonate or alkali metal carbonate as a taggant, subsequently after sale adding to the toner an acid whereby bubbling will occur, and thus the toner identified. In one specific embodiment, the toner being tested contains on the surface sodium bicarbonate, and when an acid, like acetic acid is added thereto effervescent, or a gas is generated, and the toner is identified.

In embodiments of the present invention, there is provided a process for the authentication of toner compositions which comprises the addition to the toner of an alkali metal bicarbonate, or formulating a toner with an alkali metal bicarbonate and thereafter adding thereto an acid thereby causing the formation of effervescence; and a process for the verification of toner compositions which comprises adding to a toner containing an alkali metal bicarbonate taggant an acid thereby causing the formation of effervescence.

The process of the present invention in an embodiment thereof there was added an alkali metal salt to the toner used in Xerox Corporation 1012 TM imaging apparatus. This toner comprised of magnetite, styrene acrylate binder resin, charge control agent and a wax, had been surface treated with hydrophobic silica before addition of the alkali bicarbonate. An effective amount, for example from about 0.3 to about 3 weight percent, and preferably from about 0.5 to about 2.5 weight percent of alkali metal carbonate or alkali bicarbonate such as sodium bicarbonate powder is added to, or present in the toner, which toner possesses an average particle size by volume diameter of from about 10 to about 20 microns, and preferably 11 microns, and the mixture resulting can then be blended in a high speed blender for 50 to 200 seconds. To a sample of the toner, from 0.5 to 2 grams in a test tube or vial, can be added about 3 to 5 milliliters of dilute acetic acid or commercially available vinegar. Effervescence is apparent within about 3 seconds. The same toner without the sodium bicarbonate or sodium carbonate did not effervesce when an acid like acetic acid was added thereto.

Various known alkali metal bicarbonates can be selected for the process of the present invention, such as sodium bicarbonate, potassium bicarbonate, lithium bicarbonate, and the like. Also, alkali carbonates such as lithium, sodium and potassium carbonates can be used. In embodiments, the bicarbonate, or carbonate can be added to the toner during the preparation thereof, or preferably subsequent to the preparation thereof by blending the toner with a bicarbonate powder from 0.3 to 3 weight percent in a Henschel Blender, wherein the toner and bicarbonate or carbonate taggant are intimately mixed for from about 1 to about 5 minutes with the mixing blades operating at about 3,000 to about 5,000 RPM; whereby the bicarbonate or carbonate particles will become associated with the toner particles and whereby the bicarbonate or carbonate will usually reside on the toner surface.

Examples of acids that can be added to the toner include known acids like acetic acid, sulfuric acid, hydrochloric acid, phosphoric acid and the like, which acids can in embodiments be diluted to, for example, from about 0.1 to about 1.0 weight percent. Vinegar with about 4 weight percent of acetic acid is preferred in embodiments of the present invention.

The toners selected for the process of the present invention can be comprised of resin particles, pigment particles, optional additives, such as charge additives, and the like. Illustrative examples of suitable toner resins selected for the toner compositions of the present invention include polyamides, polyolefins, styrene acrylates, styrene methacrylates, styrene butadienes, crosslinked styrene polymers, epoxies, polyurethanes, vinyl resins, including homopolymers or copolymers of two or more vinyl monomers; and polymeric esterification products of a dicarboxylic acid and a diol comprising a diphenol. Vinyl monomers include styrene, p-chlorostyrene, unsaturated mono-olefins such as ethylene, propylene, butylene, isobutylene and the like; saturated mono-olefins such as vinyl acetate, vinyl propionate, and vinyl butyrate; vinyl esters like esters of monocarboxylic acids including methyl acrylate, ethyl acrylate, n-butylacrylate, isobutyl acrylate, dodecyl acrylate, n-octyl acrylate, phenyl acrylate, methyl methacrylate, ethyl methacrylate, and butyl methacrylate; acrylonitrile, methacrylonitrile, acrylamide; mixtures thereof; and the like. Specific examples of toner resins include styrene butadiene copolymers with a styrene content of from about 70 to about 95 weight percent. In addition, crosslinked resins, including polymers, copolymers, and homopolymers of the aforementioned styrene polymers may be selected.

As one toner resin, there can be selected the esterification products of a dicarboxylic acid and a diol comprising a diphenol, which resins are illustrated in U.S. Pat. No. 3,590,000, the disclosure of which is totally incorporated herein by reference. Other specific toner resins include styrene/methacrylate copolymers, and styrene/butadiene copolymers; PLIOLITES®; suspension polymerized styrene butadienes, reference U.S. Pat. No. 4,558,108, the disclosure of which is totally incorporated herein by reference; polyester resins obtained from the reaction of bisphenol A and propylene oxide; followed by the reaction of the resulting product with fumaric acid, and branched polyester resins resulting from the reaction of dimethylterephthalate, 1,3-butanediol, 1,2-propanediol, and pentaerythritol, styrene acrylates, and mixtures thereof. Also, known waxes with a molecular weight of from about 1,000 to about 20,000 such as polyethylene, polypropylene, and paraffin waxes can be included in, or on the toner compositions as fuser roll release agents.

The resin particles are present in a sufficient, but effective amount, for example from between about 60 to about 95 weight percent. Thus, when 1 percent by weight of the charge enhancing additive is present, and 10 percent by weight of pigment or colorant, such as carbon black, is contained therein, about 89 percent by weight of resin is selected. Also, a charge enhancing additive may be included in the toner, or coated on the toner pigment particles. When used as a coating, the charge enhancing additive is present in an amount of from about 0.1 weight percent to about 5 weight percent, and preferably from about 0.3 weight percent to about 1 weight percent.

Numerous well known suitable pigments or dyes can be selected as the colorant for the toner particles including, for example, carbon black like REGAL 300®, nigrosine dye, aniline blue, magnetite, or mixtures thereof. The pigment, which is preferably carbon black, should be present in a sufficient amount to render the toner composition highly colored. Generally, the pigment particles are present in amounts of from about 1 percent by weight to about 20 percent by weight, and preferably from about 2 to about 10 weight percent based on the total weight of the toner composition; however, lesser or greater amounts of pigment particles may be selected.

When the pigment particles are comprised of magnetites, thereby enabling single component toners in some instances, which magnetites are comprised of a mixture of iron oxides ($FeO.Fe_2O_3$) including those commercially available as MAPICO BLACK™, they are present in the toner composition in an amount of from about 10 percent by weight to about 70 percent by weight, and preferably in an amount of from about 10 percent by weight to about 50 percent by weight. Mixtures of carbon black and magnetite with from about 1 to about 15 weight percent of carbon black, and preferably from about 2 to about 6 weight percent of carbon black, and magnetite, such as Mapico Black, in an amount of, for example, from about 5 to about 60, and preferably from about 10 to about 50 weight percent can be selected.

There can also be blended with the toner compositions external additive particles including flow aid additives, which additives are usually present on the surface thereof. Examples of these additives include colloidal silicas such as AEROSIL®, metal salts and metal salts of fatty acids inclusive of zinc stearate, aluminum oxides, cerium oxides, and mixtures thereof, which additives are generally present in an amount of from about 0.1 percent by weight to about 5 percent by weight, and preferably in an amount of from about 0.1 percent by weight to about 1 percent by weight. Several of the aforementioned additives are illustrated in U.S. Pat. Nos. 3,590,000; 3,720,617; 3,655,374 and 3,983,405, the disclosures of which are totally incorporated herein by reference. Preferred surface additives include zinc stearate and AEROSIL R972®.

As toner charge enhancing additives, there can be selected, for example, distearyl dimethyl ammonium methyl sulfate, ammonium bisulfates, organic sulfate and sulfonates as illustrated in U.S. Pat. No. 4,338,390, the disclosure of which is totally incorporated herein by reference, which additives can impart a positive charge to the toner composition. Further, there can be selected alkyl pyridinium compound charge additives as illustrated in U.S. Pat. No. 4,298,672, the disclosure of which is totally incorporated herein by reference. Moreover, there can be selected for the processes of the present invention toner compositions with negative charge enhancing additives, reference for example U.S. Pat. Nos. 4,411,974 and 4,206,064, the disclosures of which are totally incorporated herein by reference. The '974 patent discloses negatively charged toner compositions comprised of resin particles, pigment particles, and as a charge enhancing additive ortho-halo phenyl carboxylic acids. Similarly, there are disclosed in the '064 patent toner compositions with chromium, cobalt, and nickel complexes of salicylic acid as negative charge enhancing additives. Also, as charge additives there can be selected tetraalkyl, wherein alkyl, for example, contains from 1 to about 30 carbon atoms, ammonium bisulfate charge enhancing additives such as distearyl dimethyl ammonium bisulfate, tetramethyl ammonium bisulfate, tetraethyl ammonium bisulfate, tetrabutyl ammonium bisulfate, and preferably dimethyl dialkyl ammonium bisulfate compounds where the dialkyl radicals contain from about 10 to about 30 carbon atoms, and more preferably dialkyl radicals with from about 14 to about 22 carbon atoms, and the like, as illustrated in U.S. Pat. No. 4,937,157, the disclosure of which is totally incorporated herein by reference. Additionally, other charge additives that may be selected are illustrated in U.S. Pat. Nos. 3,944,493; 4,007,293; 4,079,014; 4,394,430 and 4,560,635, which illustrates a toner with a distearyl dimethyl ammonium methyl sulfate charge additive, the disclosures of each of these patents being totally incorporated herein by reference.

As colored, other than black pigment, the toner may contain cyan, magenta, or yellow pigments. Examples of magenta materials that may be selected as pigments include, for example, 2,9-dimethyl-substituted quinacridone and anthraquinone dye identified in the Color Index as CI 60710, CI Dispersed Red 15, diazo dye identified in the Color Index as CI 26050, CI Solvent Red 19, and the like. Illustrative examples of cyan materials that may be used as pigments include copper tetra-4-(octadecyl sulfonamido) phthalocyanine, x-copper phthalocyanine pigment listed in the Color Index as CI 74160, CI Pigment Blue, and Anthrathrene Blue, identified in the Color Index as CI 69810, Special Blue X-2137, and the like; while illustrative examples of yellow pigments that may be selected are diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as Foron Yellow SE/GLN, CI Dispersed Yellow 33, 2,5-dimethoxy-4-sulfonanilide phenylazo-4'-chloro-2,5-dimethoxy acetoacetanilide, and Permanent Yellow FGL. The aforementioned pigments can be incorporated into the toner compositions of the present invention in various effective amounts. In one embodiment, the pigment particles are present in the toner composition in an amount of from about 2 percent by weight to about 65 percent by weight calculated on the weight of the dry toner.

The toner compositions can be prepared by a number of known methods such as admixing and heating resin particles such as styrene butadiene copolymers, pigment particles such as magnetite, carbon black, or mixtures thereof, and preferably from about 0.5 percent to about 5 percent of the aforementioned charge enhancing additives, or mixtures of charge additives, in a toner extrusion device, such as the ZSK53 available from Werner Pfleiderer, and removing the formed toner composition from the device. Subsequent to cooling, the toner composition is subjected to grinding utilizing, for example, a Sturtevant micronizer for the purpose of achieving toner particles with a volume median diameter of less than about 25 microns, and preferably of from about 8 to about 12 microns, which diameters are determined by a Coulter Counter. Subsequently, the toner compositions can be classified utilizing, for example, a Donaldson Model B classifier for the purpose of removing fines, that is toner particles less than about 4 microns volume median diameter. Thereafter, there is added to the toner as a taggant alkali metal carbonate or the alkali metal bicarbonate by blending as illustrated herein.

For the formulation of developer compositions, there can be mixed with the toner composition carrier components, particularly those that are capable of triboelectrically assuming an opposite polarity to that of the toner composition. Accordingly, the carrier particles can be selected to be of a negative polarity enabling the toner particles, which are positively charged, to adhere to and surround the carrier particles. Illustrative examples of carrier particles include iron powder, steel, nickel, iron, ferrites, including copper zinc ferrites, and the like. The selected carrier particles can be used with or without a coating, the coating generally containing terpolymers of styrene, methylmethacrylate, and a silane, such as triethoxy silane, reference U.S. Pat. Nos. 3,526,533 and 3,467,634, the disclosures of which are totally incorporated herein by reference; polymethyl methacrylates; other known coatings; and the like. The carrier particles may also include in the coating, which coating can be present in one embodiment in an amount of from about 0.1 to about 3 weight percent, conductive substances such as carbon black in an amount of from about 5 to about 30 percent by weight. Polymer coatings not in close proximity in the triboelectric series can also be selected, reference U.S. Pat. Nos. 4,937,166 and 4,935,326, the disclosures of which are totally incorporated herein by reference, including for example KYNAR® and polymethylmethacrylate mixtures (40/60). Coating weights can vary, generally, however, from about 0.3 to about 2, and preferably from about 0.5 to about 1.5 weight percent polymer coating weight is selected.

Furthermore, the diameter of the carrier particles, preferably spherical in shape, is generally from about 30 microns to about 1,000, and preferably about 50 microns to about 200 microns, thereby permitting them to possess sufficient density and inertia to avoid adherence to the electrostatic images during the development process. The carrier component can be mixed with the toner composition in various suitable combinations, such as for example from between about 1 to 5 parts per toner to about 100 parts to about 200 parts by weight of carrier.

The toner and developer compositions illustrated herein and with the carbonate or bicarbonate taggant may be selected for use in electrostatographic imaging apparatuses containing therein photoconductive imaging members. Thus, the toner and developer compositions can be used with layered photoreceptors that are capable of being charged negatively, such as those described in U.S. Pat. No. 4,265,990, the disclosure of which is totally incorporated herein by reference. Illustrative examples of inorganic photoreceptors that may be selected for imaging and printing processes include selenium; selenium alloys, such as selenium arsenic, selenium tellurium and the like; halogen doped selenium substances; and halogen doped selenium alloys. Other known similar photoreceptors can be selected.

The following Examples are being supplied to further define various species of the present invention, it being noted that these Examples are intended to illustrate and not limit the scope of the present invention. Parts and percentages are by weight unless otherwise indicated. No effervescence was visually observed. Comparative Examples are also provided.

COMPARATIVE EXAMPLE I

There was prepared in an extrusion device, available as ZSK 53 from Werner Pffleiderer, a toner composition by adding 50 weight precent of magnetite MB20™ obtained from Titan Kogyo, 1 weight percent of a quaternary ammonium salt charge additive, BONTRON P-51™ obtained from Orient Chemical, 46.5 weight percent of a styrene-butylacrylate resin with a glass transition temperature of 65° C. obtained from Sanyo Chemical Company, and 2.5 weight percent of a polypropylene wax, 660P™ obtained from Sanyo Chemical Company The extrusion product was cooled then crushed in a Fitzmill and micronized to toner size using a Sturtevant micronizer. Thereafter, the aforementioned toner was classified in a Donaldson Model B Classifier to a volume median size diameter of 12 microns with a fines content of 4 microns or less at 5 percent by number.

The classified toner was then mixed with 0.2 weight percent of silica AEROSIL R972® obtained from Degussa Chemical using a Lodige blender. When a 0.5 gram sample of the above prepared toner was placed in vinegar, no effervescence occurred.

EXAMPLE I

To 150 grams of the toner prepared in Comparative Example I was added 0.67 weight percent of sodium bicarbonate and the resulting mixture was blended in a small high speed powder mill at 10,500 RPM for 100 seconds. The resultant toner was used to make copies (developed images on paper) in a Xerox Corporation 1012™ imaging apparatus. Copies with excellent copy quality were obtained under ambient conditions of 55 percent RH and 72° F. When 0.5 gram of the above prepared toner was placed into 5 milliliters of vinegar (diluted acetic acid) effervescence occurred within one minute.

EXAMPLE II

The procedure for surface blending sodium bicarbonate powder with toner as described in Example I was repeated with 2.7 weight percent at ambient conditions of 55 percent RH at 72° F. and 80 percent RH at 80° F. This toner when added to vinegar (diluted acetic acid) effervesced immediately, within about 1 to 2 seconds.

COMPARATIVE EXAMPLE II

There was prepared by essentially repeating the process of Example I in a extrusion device, available as ZSK.28 from Werner Pffleiderer, a toner composition by adding 50 weight percent of the magnetite of Example I obtained from Titan Kogyo, 0.7 weight percent of a chromium complex dye, P52™ obtained from Hodogaya Chemical, 2.5 weight percent of wax, 660P™ obtained from Sanyo Chemical Company, and the styrene butylacrylate of Example I, remaining amount to equal 100 percent amount of all toner components. The extrusion toner product was cooled then crushed in a Fitzmill and micronized to toner size using a sturtevant micronizer. Thereafter, the aforementioned toner was classified in a Donaldson Model B Classifier to a volume median size diameter of 12 microns with a fines content of 4 microns or less at 5 percent by number.

The classified toner was mixed with 0.2 weight percent of silica as AEROSIL R972® obtained from Degussa Chemical using a Lodige blender. When a 0.5 gram sample of the above prepared toner was placed into vinegar, no effervescence occurred.

EXAMPLE III

The negatively charged monocomponent toner of comparative Example II, 100 grams, was surface treated with 2 weight percent of sodium bicarbonate blended in a small high speed powder mill blender at 10,500 RPM for 100 seconds. This toner was print tested in a Xerox Corporation 4030™ printer and there was provided excellent print quality at laboratory ambient conditions of 55 percent RH at 72° F. and at 80 percent RH at 80° F. When 0.5 gram of the above prepared toner was placed into 5 milliliters of vinegar (diluted acetic acid) effervescence occurred immediately.

COMPARATIVE EXAMPLE III

Toner can be prepared essentially by repeating the process of Example I and by melt mixing in an extruder 69 weight percent of styrene butadiene copolymer (91/9) with a Tg of 55° C. with 30 weight percent of magnetite MO4232™, obtained from Harcross, and 1 weight percent of the quaternary ammonium salt charge additive distearyl dimethyl ammonium methyl sulfate. The toner is micronized in sturtevant micronizer and classified in a Donaldson Model B to 11.5 microns.

Developer is prepared by blending 3 weight percent of the above prepared toner with iron powder of 125 micron diameter which had been coated with 0.15 weight percent of KYNAR® fluorocarbon polymer. Satisfactory prints can be obtained in a Xerox Corporation 1090® imaging apparatus. The above prepared toner, about 1 gram, when placed into vinegar (diluted acetic acid) did not effervesce.

EXAMPLE IV

Fifty grams of the toner of Comparative Example III is surface treated with 2 weight percent sodium bicarbonate blended in a small high speed powder mill at 10,500 RPM for 100 seconds. This toner is used to make copies with a Xerox Corporation 1090® imagining apparatus. Copies with satisfactory copy quality are obtained under laboratory ambient conditions of 55 percent RH at 72° F. and at 80 percent RH at 80° F. When 0.5 gram of the above prepared toner was placed into 5 milliliters of vinegar (diluted acetic acid) effervescence occurred immediately.

Other modifications of the present invention may occur to those skilled in the art subsequent to a review of the present application, and these modifications, including equivalents thereof, are intended to be included within the scope of the present invention.

What is claimed is:

1. A process for the verification of toner compositions which comprises adding to the toner an alkali metal bicarbonate, and thereafter adding thereto an acid thereby causing the formation of effervescence.

2. A process for the verification of toner compositions which comprises adding to a toner containing an alkali metal bicarbonate, or an alkali metal carbonate taggant, an acid thereby causing effervescence.

3. A process in accordance with claim 1 wherein the bicarbonate is sodium bicarbonate.

4. A process in accordance with claim 2 wherein the carbonate is sodium carbonate.

5. A process in accordance with claim 2 wherein the acid is acetic acid.

6. A process in accordance with claim 2 wherein the bicarbonate or carbonate is present in an amount of from about 0.5 weight percent to about 3.0 weight percent.

7. A process in accordance with claim 2 wherein the acid is sulfuric acid, or hydrochloric acid added in an amount of from about 0.1 to about 1.0 weight percent or phosphoric acid added in an amount of from about 0.3 weight percent to about 5 weight percent.

8. A process in accordance with claim 2 wherein effervescence forms within from about 1 to about 10 seconds after the addition of the acid.

9. A process in accordance with claim 2 wherein the toner is comprised of resin particles and pigment particles.

10. A process in accordance with claim 8 wherein the resin particles are comprised of styrene acrylates, styrene methacrylates, or styrene butadienes.

11. A process in accordance with claim 8 wherein the pigment particles are comprised of carbon black.

12. A process in accordance with claim 8 wherein the pigment particles are comprised of magnetite.

13. A process in accordance with claim 8 wherein the pigment particles are comprised of cyan, magneta, yellow, or mixtures thereof.

14. A process in accordance with claim 8 wherein the toner contains a charge enhancing additive.

15. A process in accordance with claim 14 wherein the charge additive is distearyl dimethyl ammonium methyl sulfate.

16. A process in accordance with claim 14 wherein the charge additive is chromatic complex.

17. A process in accordance with claim 2 wherein toner contains from about 0.5 to about 5 weight percent of wax.

18. A process in accordance with claim 17 wherein the wax is polypropylene, or polyethylene.

19. A process in accordance with claim 1 wherein the toner contains surface additives.

20. A process in accordance with claim 19 wherein the surface additives are comprised of colloidal silica particles, or titanium dioxide.

21. A process in accordance with claim 2 wherein the toner contains surface additives.

22. A process in accordance with claim 1 wherein effervescence occurs within a period of from about 1 to about 5 seconds.

23. A process in accordance with claim 2 wherein effervescence occurs within a period of from about 1 to about 5 seconds.

24. A process for the authentication of toner compositions which comprises adding said toner containing an alkali metal carbonate, or an alkali metal bicarbonate to an acid thereby causing effervescence.

* * * * *